(12) United States Patent
Schmidt et al.

(10) Patent No.: US 6,889,308 B1
(45) Date of Patent: May 3, 2005

(54) METHOD AND APPARATUS FOR PROTECTING PAGE TRANSLATIONS

(75) Inventors: Rodney W. Schmidt, Dripping Springs, TX (US); Brian C. Barnes, Round Rock, TX (US); Geoffrey S. Strongin, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 199 days.

(21) Appl. No.: 10/051,448

(22) Filed: Jan. 18, 2002

(51) Int. Cl.$^7$ .............................................. G06F 12/00
(52) U.S. Cl. ..................... 711/203; 711/206; 711/209
(58) Field of Search .............................. 711/203, 206, 711/209

(56) References Cited

U.S. PATENT DOCUMENTS

| | | | | |
|---|---|---|---|---|
| 4,835,734 A | * | 5/1989 | Kodaira et al. | ............. 711/209 |
| 5,029,070 A | * | 7/1991 | McCarthy et al. | .......... 711/143 |
| 5,278,962 A | * | 1/1994 | Masuda et al. | ............. 711/207 |
| 5,386,579 A | * | 1/1995 | Bourekas et al. | ............. 712/43 |
| 6,574,721 B1 | * | 6/2003 | Christenson et al. | ....... 711/209 |

* cited by examiner

Primary Examiner—Mano Padmanabhan
Assistant Examiner—Mehdi Namazi
(74) Attorney, Agent, or Firm—Williams, Morgan & Amerson (57) ABSTRACT

In one aspect of the present invention, an apparatus for converting a virtual address to a physical address is provided. The apparatus comprises a comparator, a first mechanism, and a second mechanism. The comparator is adapted to receive the virtual address and deliver a first signal indicating that the virtual address is outside a first preselected range, and a second signal indicating that the virtual address is within the first preselected range. The first mechanism is adapted to generate a first physical address from the virtual address in response to receiving the first signal, and the second mechanism is adapted to generate a second physical address from the virtual address in response to receiving the second signal.

12 Claims, 6 Drawing Sheets

METHOD AND APPARATUS FOR PROTECTING PAGE TRANSLATIONS

BACKGROUND OF THE INVENTION

1. Field of the Invention

This invention relates generally to a data processor, and, more particularly, to a method and apparatus for ensuring secure operation of the data processor.

2. Description of the Related Art

General purpose computing systems, such as personal computers have evolved from single task devices to multi-task devices. Multitasking devices require security and protection services to protect their operating system from user processes, and to protect the processes from each other. Without protections, a rogue program, for example, could intentionally or inadvertently destroy the program code or data in the memory space belonging to the operating system or to another process.

Figure 1:
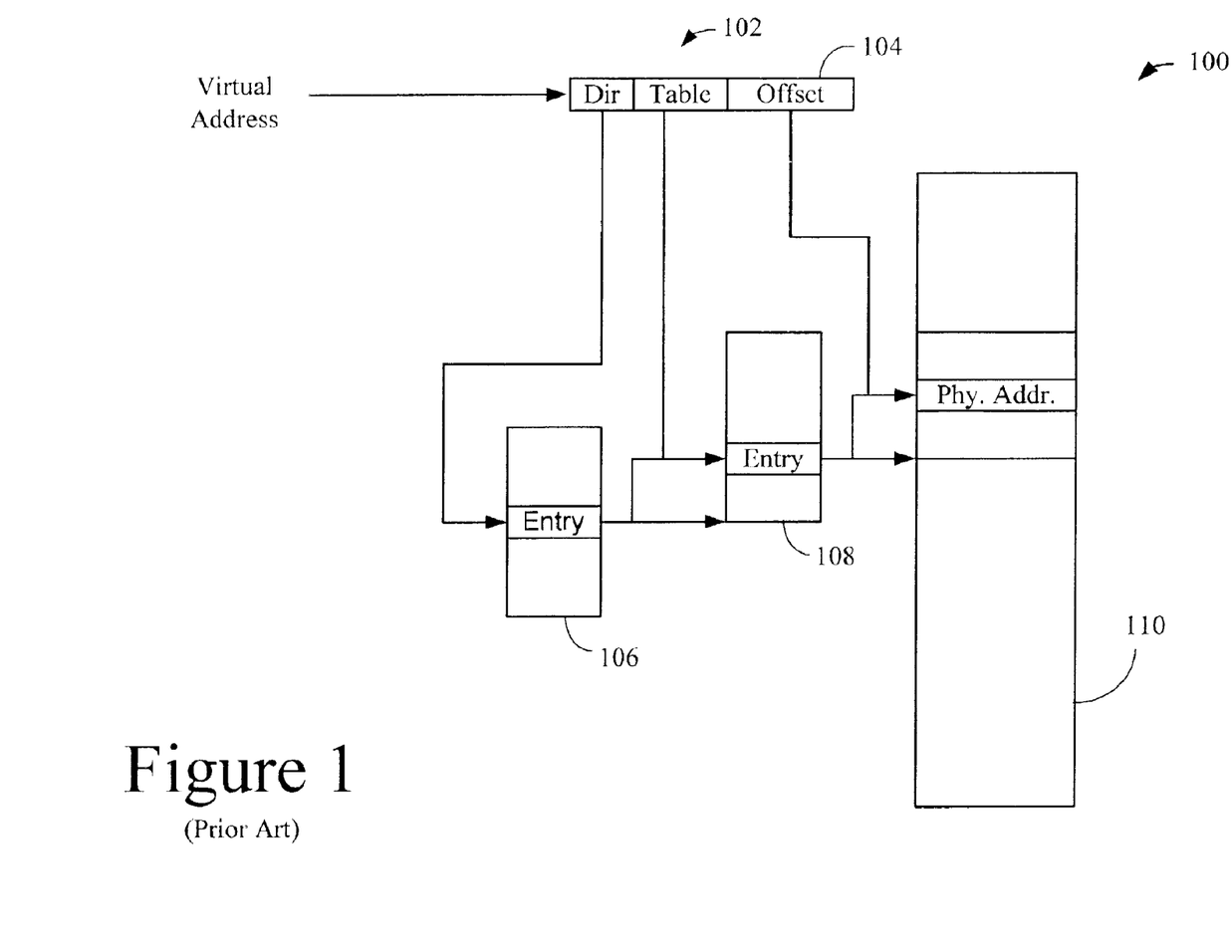
FIG. 1 schematically illustrates a block diagram representation of a memory management system based on paging.

In some systems, at least a portion of the security is obtained by implementing a memory management scheme that divides memory into sections typically known as pages. Access to these pages may then theoretically be limited or controlled by the operating system. FIG. 1 generally illustrates a block diagram representation of a typical system 100 for organizing memory based on a paging scheme. The system 100 receives a virtual address and converts the virtual address to a physical address using a multi-level lookup table.

The virtual address is composed of a page portion 102 and an offset portion 104. The page portion 102 is further broken down into a directory portion and a page table portion, which are used in a multi-table lookup process. The first table is a directory table 106, which has stored therein the addresses for a plurality of second tables, which includes a page table 108. Only one of the page tables 108 is shown herein for ease of illustration. The directory portion of the virtual address is used as a pointer into the directory table 106 to retrieve the starting address for the page table that corresponds to the particular virtual address. The page table portion of the virtual address is added to the starting address retrieved from the directory table 106 to point to a particular location within the identified page table 108. The particular location within the identified page table 108 contains a starting address of the corresponding page in physical memory 110. The offset portion 102 of the virtual address is added to the starting address of the corresponding page in physical memory 110 to arrive at the physical address that corresponds with the virtual address.

Generally, in x86 microprocessor environments, different types of software run at varying privilege levels, and thus, have varying access to the resources of the computing system. For example, the operating system runs at the highest privilege level (Ring 0), which means that the operating system is generally free to access virtually any of the system resources. Additionally, software drivers also have a relatively high privilege level and have generally unlimited access to the resources of the computing system.

The most recent version of Microsoft's Windows® operating system, Windows 2000®, now has over one million lines of code contained in its kernel and associated kernel-mode drivers. Thus, more than one million lines of code have generally free access to the system resources. There is a significant likelihood that some security defects or other bugs exist within this massive program. Thus, it may be possible for an application program running at a relatively low privilege level to breach the security afforded by the operating system through one or more of these bugs or security defects. Once allowed access to otherwise unavailable resources, such as the page table, the application program may intentionally modify data stored in memory, including the page tables. Once the page tables are modified, it may be possible to redirect the operation of the computer system to execute code from memory not originally intended. Alternatively, even an unintentional modification of the page tables could cause an application program or even the operating system to be redirected to otherwise unauthorized or unintended portions of the memory. These forays into unauthorized sections of the memory can result in one application program overwriting critical data used by another program.

The present invention is directed to overcoming, or at least reducing the effects of, one or more of the problems set forth above.

SUMMARY OF THE INVENTION

In one aspect of the present invention, a method is provided. The method comprises receiving a virtual address, and comparing at least a portion of the virtual address to a first preselected range. A first mechanism is used to generate a first physical address from the virtual address in response to the virtual address being outside the first preselected range, and a second mechanism is used to generate a second physical address from the virtual address in response to the virtual address being within the first preselected range.

In one aspect of the present invention, an apparatus for converting a virtual address to a physical address is provided. The apparatus comprises a comparator, a first mechanism, and a second mechanism. The comparator is adapted to receive the virtual address and deliver a first signal indicating that the virtual address is outside a first preselected range, and a second signal indicating that the virtual address is within the first preselected range. The first mechanism is adapted to generate a first physical address from the virtual address in response to receiving the first signal, and the second mechanism is adapted to generate a second physical address from the virtual address in response to receiving the second signal.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
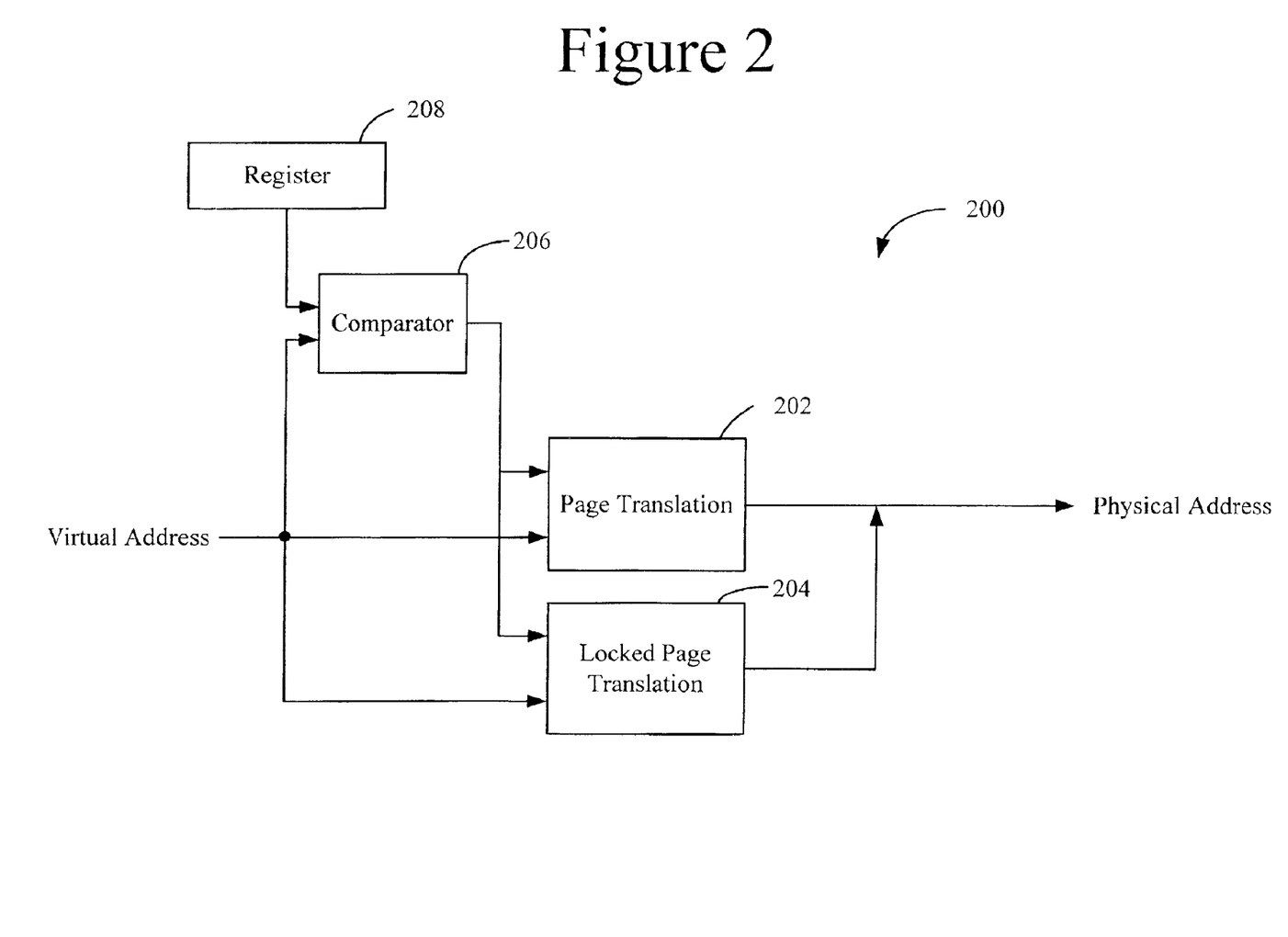
FIG. 2 schematically illustrates one embodiment of a system for bypassing a page based memory management system for select addresses.

As shown in FIG. 2, one illustrative embodiment of a system 200 for reducing the likelihood that a memory reference to a page table may be redirected by an unauthorized software program is illustrated. The system 200 is useful in a data processor (not shown) that uses a virtual addressing scheme for accessing memory. For example, the system 200 is useful in a data processor that addresses memory using a paging scheme, such as may be used in x86 type microprocessors. Moreover, the system 200 finds particular application in a data processor that assigns security attributes at the page level, such as is set forth in an application filed on Dec. 5, 2001 and entitled MEMORY MANAGEMENT SYSTEM AND METHOD PROVIDING INCREASED MEMORY ACCESS SECURITY, which is assigned to the assignee of the instant application and is hereby incorporated by reference in its entirety.

The system 200 includes a page translation mechanism 202 functionally similar to the page translation mechanism 100 of FIG. 1. Ordinarily, memory references in the form of virtual addresses are delivered to the page translation mechanism 202, where, in a manner similar to that described above, they are converted to physical addresses and delivered to a memory system (not shown). However, for a preselected range of virtual addresses, the page translation mechanism 202 is bypassed, and the physical addresses are generated by an alternative mechanism, which comprises a locked page translation mechanism 204.

A comparator 206 enables the locked page translation mechanism 204 to deliver the physical address when the virtual address falls within the preselected range of addresses. Alternatively, the comparator 206 enables the page translation mechanism 202 to deliver the physical address when the virtual address falls outside the preselected range of addresses. The preselected range of addresses is identified by a value stored in a register 208. Thus, a first input terminal of the comparator 206 is coupled to receive the value stored in the register 208 and a second input terminal of the comparator 206 is coupled to receive the virtual address. An output terminal of the comparator 206 is coupled to both the page translation mechanism 202 and the locked page translation mechanism 204 to alternatively enable the mechanisms 202, 204.

Generally, a secure kernel of software is responsible for storing the value in the register 208 and the values in the locked page translation mechanism 204 at a preselected time, such as during initialization of the data processor. The secure kernel of software and its operation are described in greater detail in conjunction with the above-referenced patent application entitled MEMORY MANAGEMENT SYSTEM AND METHOD PROVIDING INCREASED MEMORY ACCESS SECURITY. Thus, the secure kernel identifies a range of addresses in memory in which the page tables will be stored, and during initialization stores a value in the register 208 that identifies this range of addresses. Thus, normal memory references falling outside the preselected range are managed by the page translation mechanism 202 such that pages of memory may be swapped into and out of physical memory, as is conventionally done in a paging system. On the other hand, the virtual addresses falling within the preselected range are "hard mapped" into physical memory by the locked page translation mechanism 204. That is, the physical addresses (which are stored in the locked page translation mechanism 204 by the secure kernel) corresponding to the virtual addresses falling within the preselected range are located at a particular location in physical memory that does not vary during the operation of the data processor (i.e., no swapping occurs).

The secure kernal of the operating system may use these hard mapped virtual addresses to store data or information that it intends to keep secure. For example, the secure kernal may store its code and data structures therein.

By way of example, assume that the preselected range of virtual addresses is 0100 through 0200, and the corresponding range of physical addresses is 0000 through 0100. Thus, a memory reference to the virtual address 0101 would be identified as falling within the preselected range of 0100–0200, causing the comparator 206 to enable the locked page translation mechanism 204 and disable the page translation mechanism 202. The locked page translation mechanism 204 would then deliver the corresponding physical address 0001 to the memory system. Using the system 200, once the data processor completes initialization, the virtual address 0101 will always be located at physical address 0001. On the other hand, a memory reference to the virtual address 0201 would be identified as falling outside the preselected range of 0100–0200, causing the comparator 206 to disable the locked page translation mechanism 204 and enable the page translation mechanism 202. The page translation mechanism 202 will then provide the physical address corresponding to the virtual address 0201 based on the values currently stored in the page tables, which may change throughout the operation of the data processor.

Thus, memory references to the page tables cannot be misdirected or redirected by altering the values stored in the page tables. Rather, misdirecting or redirecting memory references to the page tables may only be accomplished by altering the values stored in the register 208 and the locked page translation mechanism 204, which are only accessible by the secure kernel, and not by the operating system or the software drivers.

Figure 3:
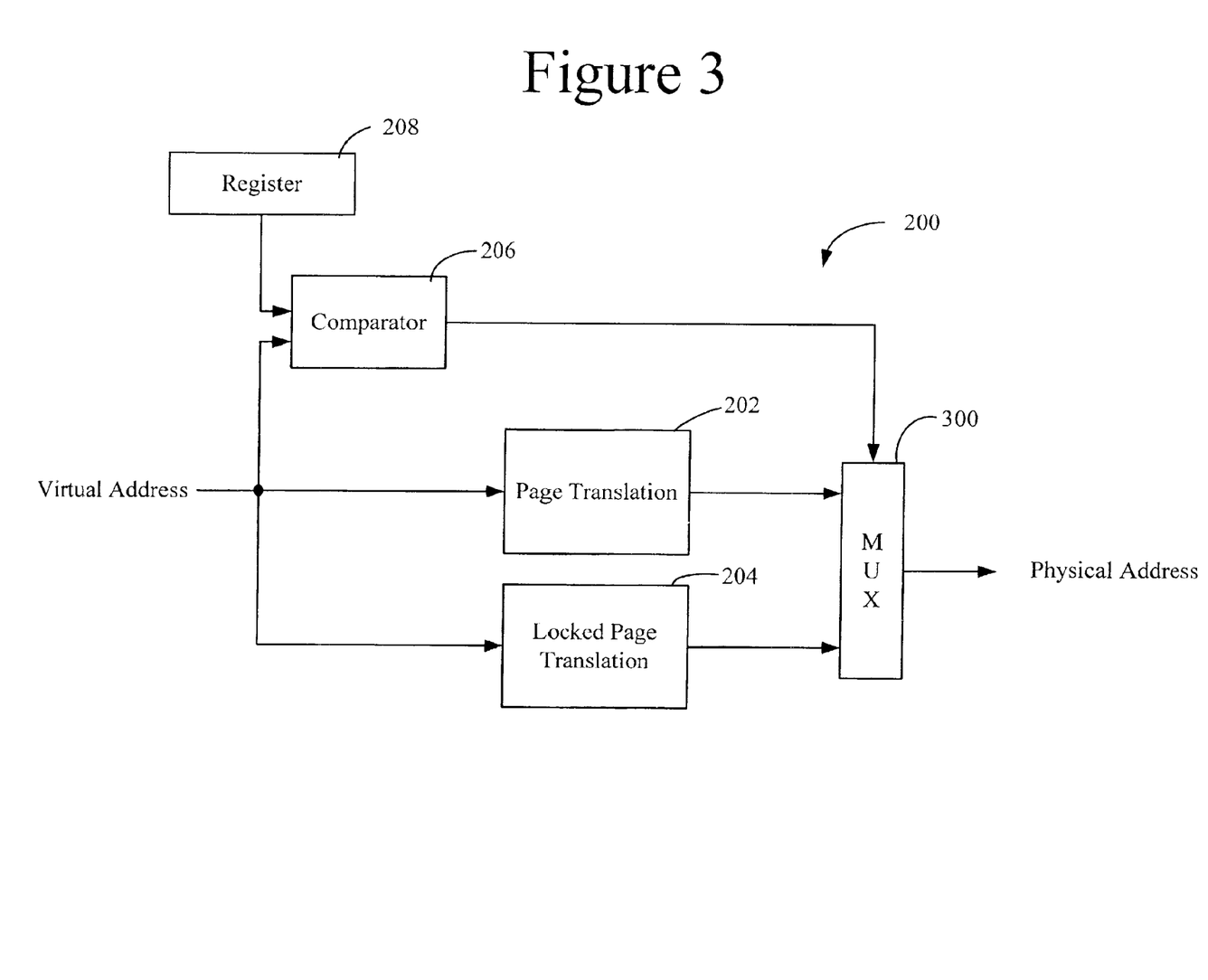
FIG. 3 schematically illustrates a first embodiment of a portion of the bypass mechanism of FIG. 2.

Turning now to FIG. 3, an alternative embodiment of a block diagram of the system 200 with a more detailed representation of a mechanism for disabling and enabling the page translation mechanism 202 and the locked page translation mechanism 204 is illustrated. A multiplexer 300 has first and second input terminals coupled to the output terminals of the page translation mechanism 202 and the locked page translation mechanism 204, respectively. A control input terminal of the multiplexer 300 is coupled to the output terminal of the comparator 206.

Thus, when the comparator 206 delivers a first signal indicating that the virtual address is outside the preselected range, the multiplexer 300 is instructed to couple the output terminal of the page translation mechanism 202 to deliver its output signal as the physical address. Alternatively, when the comparator 206 delivers a second signal indicating that the virtual address is within the preselected range, the multiplexer 300 is instructed to couple the output terminal of the locked page translation mechanism 204 to deliver its output signal as the physical address. It should be appreciated that in the embodiment illustrated in FIG. 3, the translation processes performed by the page translation mechanism 202 and the locked page translation mechanism 204 are performed in parallel. That is, while the comparator 206 is determining whether the virtual address falls inside or outside the identified range, both of the translation mechanisms 202, 204 are already operating to translate the virtual address. If the address falls within the identified range, the physical address determined by the page translation mechanism 202 is discarded, blocked, or otherwise ignored. On the other hand, if the address falls outside the identified range, the physical address determined by the locked page translation mechanism 204 is discarded, blocked, or otherwise ignored. This parallel processing by the translation mechanisms 202, 204 speeds the translation process.

Figure 4:
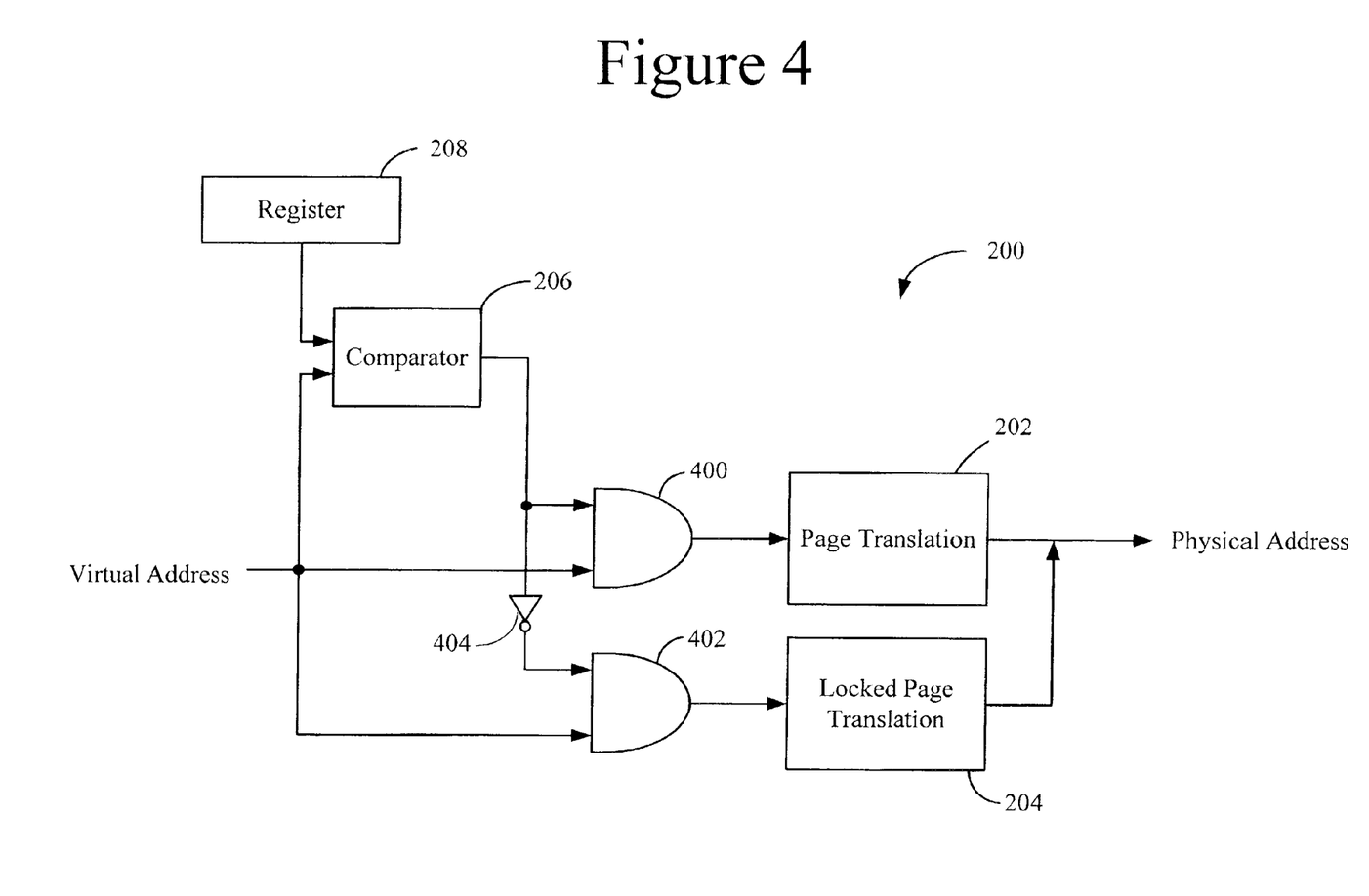
FIG. 4 schematically illustrates a second embodiment of a portion of the bypass mechanism of FIG. 2.

Turning now to FIG. 4, an alternative embodiment of a block diagram of the system 200 with a more detailed representation of a mechanism for disabling and enabling the page translation mechanism 202 and the locked page translation mechanism 204 is illustrated. A first AND gate 400 has a first input terminal coupled to receive the virtual address and a second input terminal coupled to the output terminal of the comparator 206. An output terminal of the first AND gate 400 is coupled to the input terminal of the page translation mechanism 202. Similarly, a second AND gate 402 has a first input terminal coupled to receive the virtual address and a second input terminal coupled to the output terminal of the comparator 206 through an inverter 404. An output terminal of the second AND gate 400 is coupled to the input terminal of the locked page translation mechanism 204.

Thus, when the comparator 206 delivers the first signal, indicating that the virtual address is outside the preselected range, the first AND gate 400 is enabled to pass the virtual address to the page translation mechanism 202 where the corresponding physical address is determined. The first signal, as delivered through the inverter 404, disables the second AND gate 402 from delivering the virtual address to the locked page translation mechanism 204, preventing the hard mapped address from being delivered as the physical address. Alternatively, when the comparator 206 delivers the second signal, indicating that the virtual address is within the preselected range, the second AND gate 402 is enabled to pass the virtual address to the locked page translation mechanism 204 where the corresponding physical address is determined. The second signal also disables the first AND gate 400 from delivering the virtual address to the page translation mechanism 202.

Figure 5:
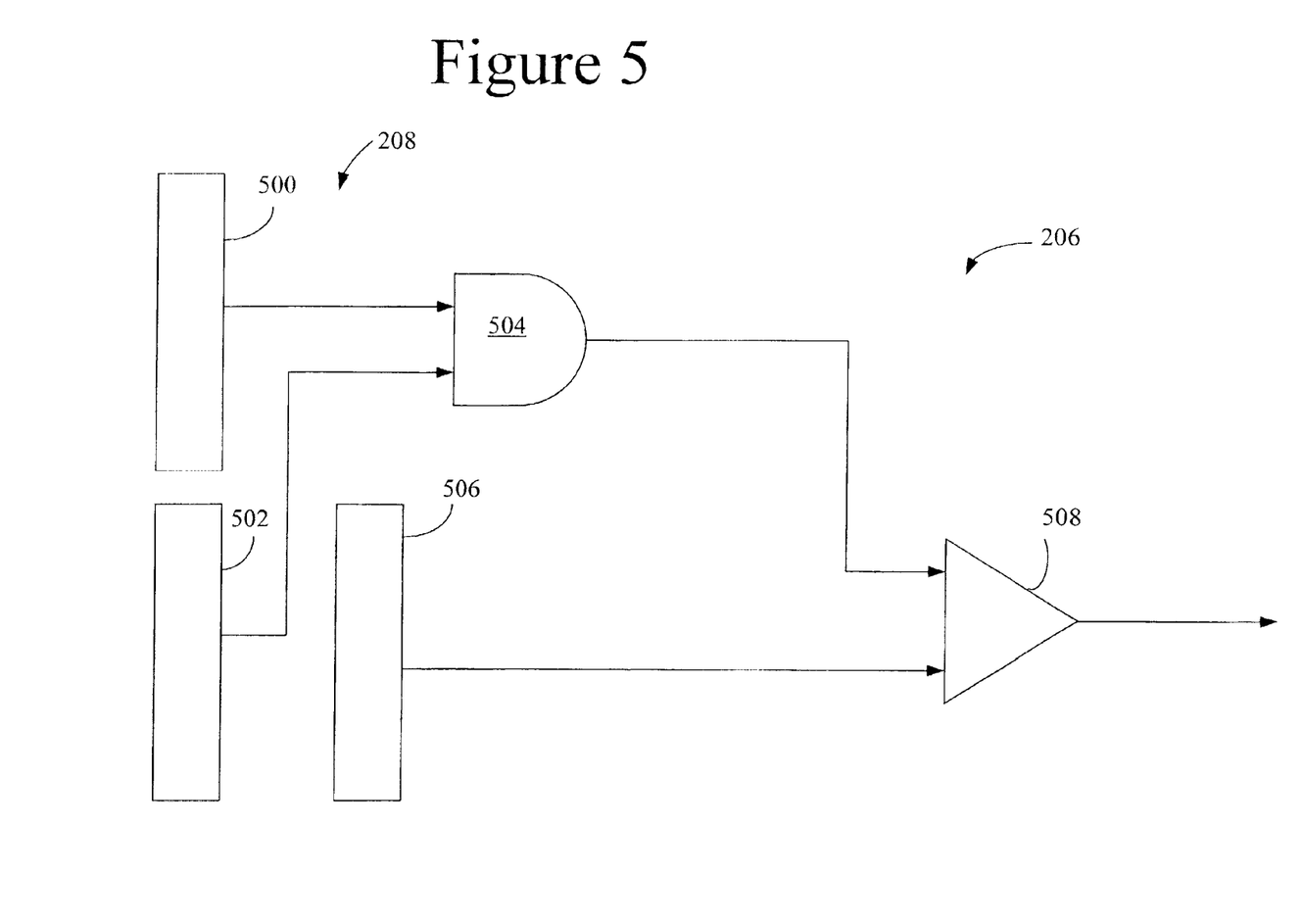
FIG. 5 schematically illustrates one embodiment of a structure for implementing a comparator function of FIG. 2.

Turning now to FIG. 5, one embodiment of the comparator 206 and the register 208 is illustrated. Generally, the comparator 206 checks to determine if the virtual address is contained within the protected region of the memory. In the illustrated embodiment, this checking process is accomplished by first masking off the lower order bits and then comparing only the upper order bits of the virtual address with a value stored in the register 208. For example, using a base 10 addressing system, if the protected region appears at addresses 500–599 (i.e., the 500s), then it can be quickly determined if a virtual address, such as 533, falls within this range by first masking off the lower bits (i.e., 33), and then comparing the resulting number (i.e., 500) with the higher order bits of the protected range (i.e., 500). A match indicates that the virtual address falls within the protected region.

A first register or buffer 500 stores the mask. The value of the mask stored within the register 500 may be varied to accommodate the size of the address and the size of the protected region. For example, assuming that the address is 40-bits in length and that the protected region is 4 k bytes, then the value of the mask could be:

1111111111111111111111111111000000000000.
Thus, the above-identified mask may be used to strip away the lower order 12-bits from the virtual address.

A second register or buffer 502 stores the virtual address. Each bit of the mask and virtual address are combined in an AND gate 504 to strip off the lower order bits and leave the higher order bits of the virtual address. For example:

| Virtual address- | 1010101010101010101010101010101010101010 |
|---|---|
| Mask - | 1111111111111111111111111111000000000000 |
| Resulting AND- | 1010101010101010101010101010000000000000. |

The address produced by the AND gate 504 is delivered to a first input of a comparator 508. A second input to the comparator 508 is coupled to a third register or buffer 506. The secure kernal has previously stored the starting address of the locked region in the register 506. Thus, the comparator 508 provides a signal that indicates when the upper order bits of the virtual address match with the upper order bits of the address of the locked region. That is, the comparator 508 provides an indication of when the virtual address falls within the locked region.

Figure 6:
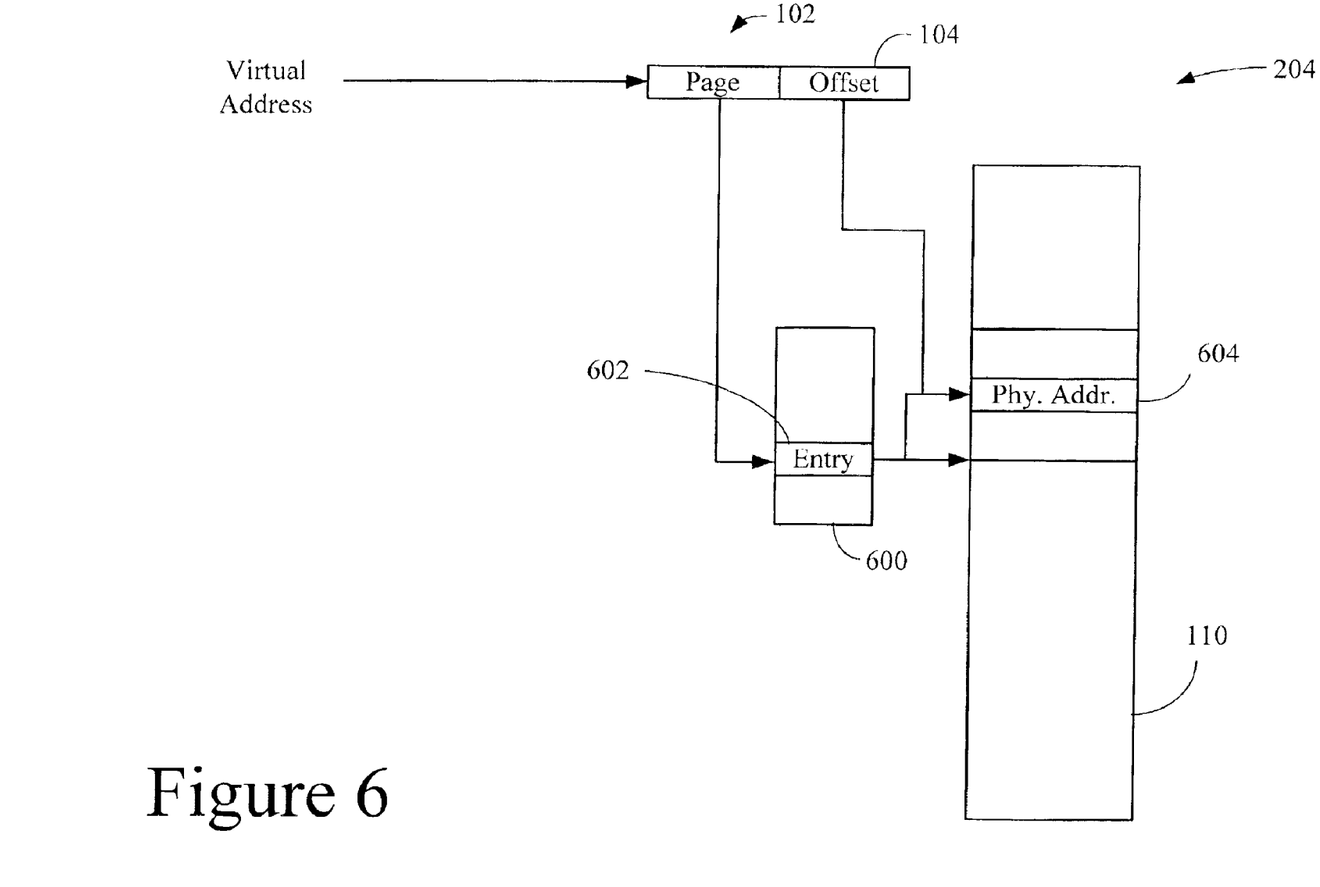
FIG. 6 schematically illustrates one embodiment of a structure and organization for implementing a locked page translation mechanism of FIG. 2.

Turning now to FIG. 6, a schematic representation of one embodiment of the locked page translation mechanism 204 is illustrated. The locked page translation mechanism 204 receives the virtual address, which is comprised of the page portion 102 and the offset portion 104. The page portion 102 of the virtual address is used as a pointer into a storage device 600, which may take the form of a register or group of registers, or a segment of the physical memory 110, such as a page with the physical memory 110. The page portion 102 identifies an entry 602 in the storage device, which has stored therein the upper bits of the physical address. The lower-order bits of the physical address are obtained from the offset portion 104 of the virtual address and appended to the entry 602 to arrive at the physical address that identifies a physical location 604 in the physical memory 110.

As discussed above, the entry 602 was stored in the storage device 600 by the secure kernel during the initialization of the data processor. Moreover, the entry 602 may not be written by the operating system, and thus, a memory reference to the page tables cannot be redirected either intentionally or accidentally by a rogue program or driver.

The system 100 has been described herein using an embodiment that hard maps a page of virtual addresses to a preselected page of physical addresses, bypassing the page translation mechanism. However, those skilled in the art will appreciate that more or less memory could be hard mapped without departing from the spirit and scope of the instant invention. Further, the embodiments described herein hard map the page tables into physical memory, however, the system could be readily modified to hard map other parameters into physical memory without departing from the spirit and scope of the instant invention.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:

receiving a virtual address;

comparing at least a portion of the virtual address to a first preselected range;

using a paging mechanism to generate a first physical address from the virtual address in response to the virtual address being outside the first preselected range; and using a hard mapped mechanism to generate a second physical address from the virtual address in response to the virtual address being within the first preselected range.

2. The method set forth in claim 1 further comprising storing an entry for a page table in the second physical address, wherein the page table entry may be used by the paging mechanism to generate the first physical address from the virtual address.

3. The method set forth in claim 1 further comprising storing at least one value representative of the second physical address during an initialization period, wherein the second mechanism uses the at least one value to generate the second physical address.

4. The method set forth in claim 3 wherein storing the at least one value representative of the second physical address during the initialization period further comprises storing the at least one value representative of the second physical address during only the initialization period.

5. The method set forth in claim 3 wherein storing the at least one value representative of the second physical address during the initialization period further comprises using secure kernel software to store the at least one value representative of the second physical address during the initialization period.

6. The method of claim 1, further comprising storing at least one value representative of the first preselected range during an initialization period.

7. The method of claim 6, wherein storing the at least one value representative of the first preselected range during the initialization period further comprises storing the at least one value representative of the first preselected range during only the initialization period.

8. The method of claim 6, wherein storing the at least one value representative of the first preselected range during the initialization period further comprises using secure kernel software to store the at least one value representative of the first preselected range during the initialization period.

9. An apparatus, comprising:

means for receiving a virtual address;

means for comparing at least a portion of the virtual address to a first preselected range;

means for using a paging mechanism to generate a first physical address from the virtual address in response to the virtual address being outside the first preselected range; and means for using a hard mapped mechanism to generate a second physical address from the virtual address in response to the virtual address being within the first preselected range.

10. An apparatus for converting a virtual address to a physical address, comprising:

a comparator adapted to receive the virtual address and deliver a first signal indicating that the virtual address is outside a first preselected range, and a second signal indicating that the virtual address is within the first preselected range;

a paging mechanism adapted to produce a first physical address from the virtual address in response to receiving the first signal; and a hard mapped mechanism adapted to produce a second physical address from the virtual address in response to receiving the second signal.

11. The apparatus set forth in claim 10 further comprising a secure kernel software program adapted to store at least one value representative of the second physical address during an initialization period, wherein the hard mapped mechanism uses the at least one value to generate the second physical address.

12. The method set forth in claim 11 wherein the secure kernel software stores the at least one value representative of the second physical address during only the initialization period.

* * * * *